March 1, 1960 K. PAULE 2,927,262
REGULATING APPARATUS WITH DIODE FOR GENERATOR
Filed Jan. 22, 1958 3 Sheets-Sheet 1

INVENTOR
Kurt Paule
by:
Michael S. Striker
Attorney

March 1, 1960          K. PAULE          2,927,262

REGULATING APPARATUS WITH DIODE FOR GENERATOR

Filed Jan. 22, 1958          3 Sheets-Sheet 3

INVENTOR
Kurt Paule
by:
Michael S. Striker
Attorney

United States Patent Office 2,927,262
Patented Mar. 1, 1960

2,927,262

REGULATING APPARATUS WITH DIODE FOR GENERATOR

Kurt Paule, Stuttgart-Oberturkheim, Germany, assignor to Robert Bosch G.m.b.H., Stuttgart, Germany Application January 22, 1958, Serial No. 710,576

Claims priority, application Germany August 24, 1957

11 Claims. (Cl. 322—25)

The present invention refers to apparatus for automatically regulating a voltage output of shunt generators, particularly for automotive vehicles, which operate against a variable load.

Apparatus of this type is usually provided with a voltage-dependent relay which controls the exciting current depending upon a voltage output of a generator. It is however necessary to provide for a regulating apparatus which is capable to cause the generator voltage output to decrease rapidly as soon as the current output or load exceeds a predetermined amount constituting a maximum permissible load for the generator. Apparatus of such type and capability has been known but only in a form which includes additional electromagnetic switches which considerably complicate the design and assembly of the apparatus and accordingly increases the cost and the space requirements. However, particularly for the use of such apparatus in automotive vehicles, it is most desirable to reduce space requirements as much as possible.

It is therefore a main object of this invention to provide for an apparatus of the type set forth which avoids the inconveniences of known equipment by avoiding additional electromagnetic switches and by permitting restriction of the space requirements to the minimum.

It is another object of this invention to provide for an apparatus of the type set forth which automatically regulates the voltage output of a generator by varying the exciting current between substantially zero and the maximum amount, depending upon varying voltage conditions which correspond to the varying load.

It is still another object of this invention to provide for regulating apparatus consisting of a comparatively small number of substantially conventional components which are reliable in operation and convenient in maintenance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
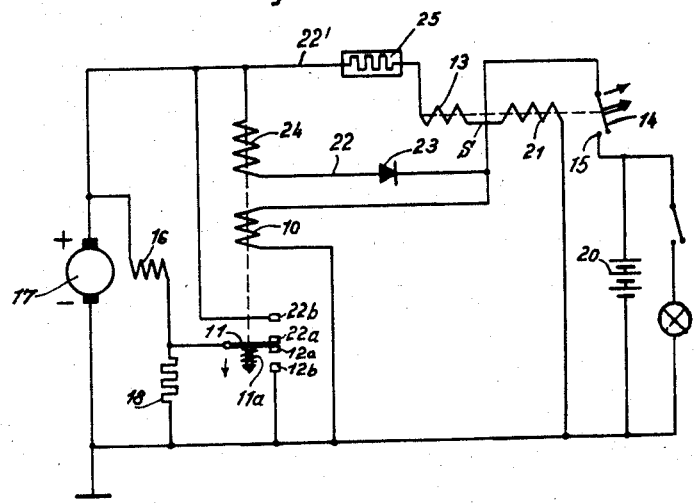
Fig. 1 is a diagram illustrating the embodiment of the invention.

The regulating apparatus according to the invention shown in Fig. 1 comprises two electromagnetic switches, one of which, a voltage-dependent relay, has an operating solenoid or voltage coil 10, a movable switching arm 11 and a pair of contacts 12a and 12b, normally held in closed position by a spring 11a, while the other, a current relay serving as a return-current preventing switch, comprises a current coil 13, a movable switching arm 14 and a stationary contact 15.

The switch arm 11 of the voltage-dependent relay is connected in series with the shunt field exciting winding 16 of the generator 17, and the stationary contact 12b is connected to electrical ground and also to the negative brush of the generator 17 so that in closed position of the contacts 12a, 12b the field resistor 18 is short-circuited while in the open position of the contacts 12a, 12b the resistor 18 is in series with the winding 16 so as to limit the exciting current to a predetermined amount.

The relay may be equipped with another set of contacts 22a, 22b which are normally open. When through additional energization of the relay the arm 11 is moved so as to close the contacts 22a, 22b, the exciting winding 16 is short-circuited because the stationary contact 22b is connected to the positive brush of the generator 17. In that case the output of the generator 17 is reduced to substantially zero.

When the solenoid coil 10 is energized only to an extent sufficing to move the arm 11 against the action of spring 11a for separating the contacts 12a, 12b but not to close the contacts 22a, 22b, the position will be as shown in Fig. 1 and the resistor 18 is made operative.

The solenoid coil 10 is connected between the negative brush of the generator 17 and a selected point of the positive main supply line 22'. In the embodiment of Fig. 1 the selected point is marked S and is located between the current coil 13 and the switch means 14, 15.

The current coil 13 constitutes a resistor in the positive supply line 22' so that a voltage drop appears across this resistor depending upon the amount of load current flowing through line 22'. The magnetic core of the coil 13 may be magnetically and structurally separated from that of the voltage-dependent relay, and particularly solenoid coil 10.

A variable impedance means, as for instance a rectifier 23, is connected in parallel with the resistor or current coil 13 and in series with an auxiliary solenoid 24 superimposed on the relay solenoid 10.

Figure 5:
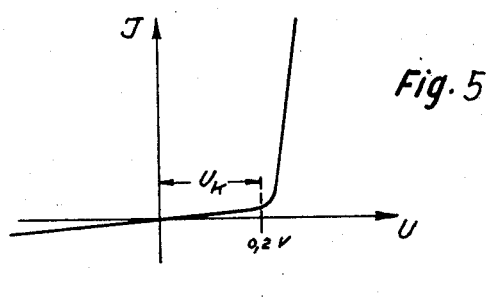
Fig. 5 is a diagram illustrating the characteristic of certain components of the embodiments shown by Figs. 1–4.

The variable impedance means must be of a type which has a V—I characteristic of the shape illustrated by Fig. 5, i.e. which is generally linear but with a pronounced break or bend at a point corresponding to a critical voltage-current ratio. This means that the variable impedance means is substantially not conductive unless the voltage applied across it is higher than said critical value. Therefore, the series combination 23, 24 connected in parallel with the resistance of current coil 13 will be passed by a current only when the voltage drop across the coil 13 reaches that critical value. Conditions can easily be arranged so that this critical voltage is obtained when the load current exceeds a predetermined amount. When this occurs, the portion of the current flowing through the series combination 23, 24 will supply additional energization to the voltage-dependent relay and thereby separate the contacts 12a, 12b, or even, if so provided, close the contacts 22a, 22b.

The variable impedance means may be a diode tube or a crystal diode, provided the characteristic is substantially of the type shown in Fig. 5. Experiments have shown that particularly suitable for the present purpose are crystal diodes as e.g. rectifier diodes made of p-n-semiconductor metal (germanium), especially those of the $A_3$—$B_5$— type. They have proved most satisfactory in connection with 6 volt light generators because their characteristic has a very low critical voltage.

In all the embodiments here described it is very important, owing to the abrupt start of the regulating effect upon the current output or load exceeding the predetermined current limit, that the variable impedance means has a pronounced bend or break in its characteristic. For this reason the ohmic resistances of the auxiliary solenoid coil 24 should not be too high, because this resistance tends to distort the dynamic characteristic of the rectifier, as compared to its static characteristic, to the effect of decidedly flattening even a well pronounced bend or break. It has proved most advantageous to mount the auxiliary coil 24 directly on the voltage-relay core, not shown, and to wind the voltage coil 10 around it. Owing to this measure both a very strong magnetic coupling is achieved between the auxiliary coil 24 and the iron core, and relatively thick wires of low resistance at reduced winding length can be used, resulting in limited winding-space requirement for the auxiliary coil 24.

In operation, the contacts 22a, 22b, if provided, serve for periodically short-circuiting the field winding 16 in case the generator 17 is driven at such a high speed that, even with the contacts 12a, 12b open and despite the resistor 18, too high an excitation current would flow in the field winding 16. The separation of the contacts 12a, 12b has, as already stated, the purpose of greatly reducing the generator voltage, should the battery charging current flowing through the current coil 13 of the return-current switch exceed a preselected maximum value. With a view to obtaining, in this case, a voltage output reduction occurring abruptly when the load current exceeds the predetermined maximum, an additional resistor 25 is incorporated in the main supply line 22' in addition to the resistor constituted by the current coil 13. This additional resistor 25 should have a value of approximately 6 milliohms, in case the current coil 13 made up with approximately ten turns of 2.5 mm. thick copper wire presents an ohmic resistance of 2.5 milliohms, and that of the auxiliary winding 24, made up with 100 turns of 0.75 mm. copper wire, is of approximately 0.2 ohm. It has been found particularly advantageous to use a cold-conducting resistor i.e. a resistor with positive temperature coefficient, as resistor 25; it would have a low resistance value at low load currents flowing from the generator, but would be heated up considerably in case of high load currents, so that the resistor 25 would have about double its cold resistance upon occurrence of the predetermined maximum current. Such resistors usually consist of a coil made of iron or binding wire. In an experimental apparatus, the additional resistor 25 had a resistance of 4 milliohms with the switch 14 open, while the resistance in the case of load currents of 10 amperes was 5 milliohms, of 20 amperes 5.9 milliohms, of 30 amperes 6.6 milliohms, of 40 amperes 7.75 milliohms, and finally with a current of 50 amperes it was 10 milliohms. The use of such a cold-conducting resistor resulted in a well pronounced bend of the characteristic at 40 amperes, since the characteristics of the rectifier 23 and of the resistor 25 show an almost orthogonal intersection.

A voltage coil 21 is added to the solenoid 13 for polarizing the latter or its core so that the arm 14 is moved into open position when the voltage output of the generator is lower than the voltage of the battery 20.

Figure 2:
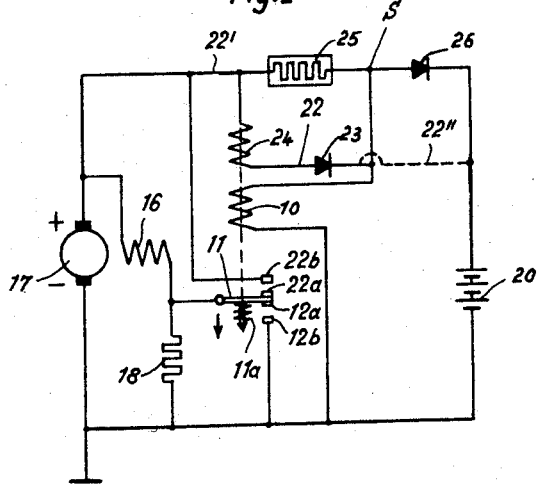
Fig. 2 is a diagram illustrating a modification of the embodiment shown by Fig. 1.

Similar good results have been achieved with the modified embodiment shown in Fig. 2. Whenever the individual components of this embodiment of the regulating apparatus are identical, or have identical effect, with those of the previously described one, they have been allotted identical reference numerals. Instead of a return-current switch 14, 15 the regulating apparatus shown in Fig. 2 has a diode, preferably a crystal diode 26 intercalated between the resistor 25 and the battery 20. Instead of a return-current switch, the diode 26 prevents the battery from being discharged in case the generator is idle or insufficiently excited. For the same reason, it is also advisable to connect the voltage coil 10 of the voltage-dependent relay with the junction point between the cold-conducting resistor 25 and of the crystal diode 26. As in the previously described embodiment, the core of the voltage coil 10 of the voltage-dependent relay also carries an auxiliary winding 24, connected by line 22 in series with a variable impedance means as a diode, e.g. a germanium diode 23, and also, together with the said diode, in parallel to the cold-conducting resistor 25.

As an alternative of this embodiment, the diode 23 can also be connected directly to the battery, as shown in Fig. 2 by a dotted line 22''. In this case, the resistor 25 may be of only 2 to 4 milliohms, instead of 8 milliohms. This is of utmost importance in automotive vehicles, since the generation of heat can be kept accordingly lower.

Figure 3:
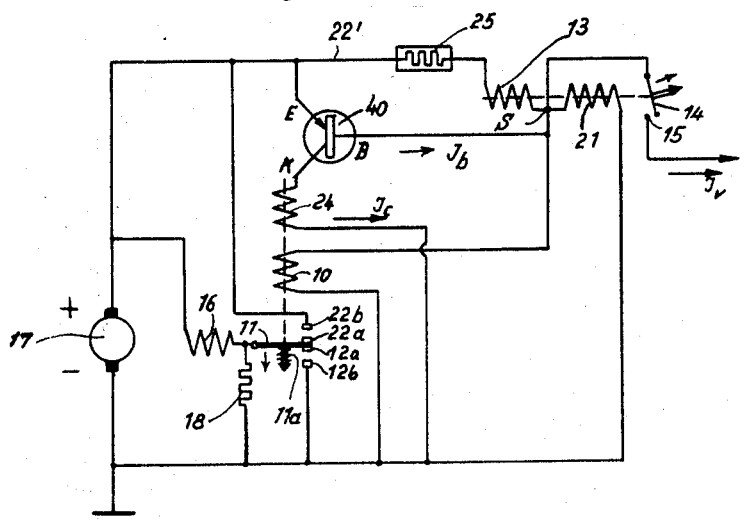
Fig. 3 is a diagram showing another embodiment of the invention.
Figure 4:
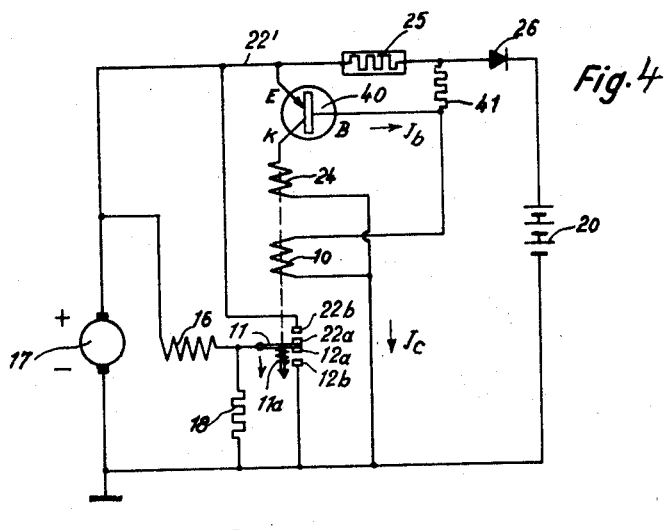
Fig. 4 is a diagram illustrating a further embodiment of the invention.

Similar to the embodiment shown in Fig. 2, in the embodiments shown in Figs. 3 and 4, a current coil 13 and a switching arm 14 of a return-current preventing switch are connected in series with the main supply line 22'. Unlike the previous embodiments, however, transistors 40 are employed instead of crystal or other diodes 23; the emitter-base circuit, serving as control circuit, of the transistors is connected in parallel with the resistor means 13 and/or 25 located in the line 22'. The emitter E of the transistor 40 is connected in both embodiments to the positive pole of the generator 17, while the collector K is connected to one end of the winding of the auxiliary coil 24. Also unlike the previous embodiments, the other end of the auxiliary coil 24 is connected, in the same manner as the voltage coil 10 mounted on a common iron core with the auxiliary coil, to the negative pole of the generator, and not to the positive pole of the battery 20 or to the supply line 22'.

In Fig. 3, the base B of the transistor 40 is connected directly to the junction point of the current coil 13 and of the polarizing winding 21 of the return-current switch. The voltage coil 10 of the voltage-dependent relay is also connected to the said junction point. A cold-conducting resistance 25, with a high positive temperature coefficient is connected in series with the current coil 13 so as to fully exploit the effect of the transistor 40.

As soon as the battery charging current $Jv$, flowing from the positive brush of the generator to the battery, the latter not shown in Fig. 3, approaches its preselected maximum, a voltage drop appears across the cold-conducting resistance 25 and the current coil 13, high enough to cause the emitter-base circuit of the transistor 40, operating similar to a diode as in Figs. 1 and 2, to become conductive and to carry a base current $Jb$. Consequently, a collector current $Jc$ will flow through the auxiliary coil 24; depending upon the current amplification factor of the transistor 40, this collector current $Jc$ will be twenty to hundred times stronger than the base current $Jb$. The auxiliary coil 24 is so polarized that it increases the field generated by the voltage coil 10 in the voltage-dependent relay. Owing to the high currnt amplification of the transistor, a comparatively weak base current $Jb$ is already sufficient for bringing the switching arm 11 of the voltage dependent relay into the short-circuiting position, in which the pair of normally open contacts 22a, 22b is closed and the field winding 16 is short-circuited. This is important, for instance, if the battery charging current should exceed its preselected maximum on account of a short-circuit.

In the circuit shown in Fig. 3, the transistor 40 supplies, in case of battery charging currents $Jv$ below the preselected maximum, no current or only a weak current through the auxiliary winding 24.

In the embodiments shown in Fig. 4, characteristic features of the previous embodiments, as per Figs. 1 to 3, are combined with each other. In order to attain a high degree of sensitivity, transistors 40 have been incorporated also in these embodimnets, while return-current preventing diodes 26, that may consist of a tube diode or of semi-conductor germanium metal, have been applied instead of the electromagnetic return-current preventing switches, in order to simplify the apparatus. The sensitivity of the instantaneous regulating effect required at high current intensities is obtained by means of cold-conducting resistors 25 which are series-connected into the main supply line 22' between the positive pole of the generator 17 and the battery 20. In the embodiment of Fig. 4 an additional resistor 41 is used to supply a biasing voltage to the transistor 40 as long as a current flows through the voltage coil 10 of the voltage-dependent relay.

It will be understood that each of the elements described above, or two or more together, may also find a useful application in other types of regulating apparatus differing from the types described above.

While the invention has been illustrated and described as embodied in apparatus for automatically regulating shunt generators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus, for automatically regulating the voltage output of a shunt generator, particularly for automotive vehicles, working against a variable load through a main supply line, in combination, a voltage-dependent relay device having a plurality of contacts, in circuit with the shunt field exciting winding of said generator and being movable between a plurality of contact positions for varying the exciting current between substantially zero and a maximum amount, depending upon varying voltage conditions corresponding to the varying load, said relay device comprising one operating solenoid connected to respond to varying potentials at a selected point of said main supply line, and an auxiliary solenoid co-operating with said one solenoid and connected to respond to current derived from load currents in said main supply line; resistor means of the cold-conducting type having a pronounced positive thermic characteristic and being connected in series between said generator and said load for producing across said resistor means a voltage drop varying with the varying load at a predetermined non-linear ratio; variable impedance means connected with said auxiliary solenoid so as to form a series-combination therewith, and said series-combination being connected in parallel with said resistor means, and capable of varying the portion of load current passing through said auxiliary solenoid depending upon said voltage drop, in accordance with a characteristic having a pronounced break at a point corresponding to a critical voltage-current ratio, so that the voltage output of said generator is automatically caused to decrease rapidly as soon as the load exceeds an amount determined by said critical voltage-current ratio.

2. An apparatus as set forth in claim 1, wherein said variable impedance means is a diode.

3. An apparatus as set forth in claim 2, wherein said diode is a crystal diode having a critical voltage of 0.2 volt.

4. An apparatus as set forth in claim 1, wherein said variable impedance means is the emitter-base circuit of a transistor.

5. An apparatus as set forth in claim 1, wherein said main supply line includes a return-current preventing electromagnetic switch having a solenoid coil connected in series with said resistor means between said generator and said load.

6. An apparatus as set forth in claim 1, wherein said main supply line includes a return-current preventing rectifier device connected between said generator and said load.

7. An apparatus as set forth in claim 4, wherein said auxiliary solenoid is connected in series between the collector electrode of said transistor and the generator terminal opposite to that connected with said main supply line.

8. An apparatus as set forth in claim 7, wherein an additional resistor is connected in series with said collector electrode and with said auxiliary solenoid.

9. An apparatus as set forth in claim 7, wherein said auxiliary solenoid is constituted by a coil wound on a common core with said operating solenoid.

10. An apparatus as set forth in claim 1, wherein said auxiliary solenoid is connected at one end with a point of said main supply line located between said generator and said resistor means, and with its other end to the generator terminal opposite to that connected with said main supply line, whereas said operating solenoid is connected with one end to a point of said main supply line located between said resistor means and said load, and with its other end to said opposite generator terminal.

11. An apparatus as set forth in claim 4, wherein a second auxiliary resistor is connected with one end to a point of said main supply line between said resistor means and said load, and with its other end to a junction point between the base electrode of said transistor and said operating solenoid.

References Cited in the file of this patent
UNITED STATES PATENTS

| | | |
|---|---|---|
| 2,689,316 | Gillespie | Sept. 14, 1954 |
| 2,707,263 | Jorgenson et al. | Apr. 26, 1955 |
| 2,809,301 | Short | Oct. 8, 1957 |